United States Patent [19]
Juhasz

[11] Patent Number: 5,195,248
[45] Date of Patent: Mar. 23, 1993

[54] PLUMB-BOB

[76] Inventor: Frank Juhasz, 42-37 Union St., Apt. 22B, Flushing, N.Y. 33953

[21] Appl. No.: 783,404

[22] Filed: Oct. 28, 1991

[51] Int. Cl.$^5$ ............................................. G01C 15/10
[52] U.S. Cl. ....................................... 33/393; 33/347
[58] Field of Search ................... 33/392, 393, 394, 347

[56] References Cited

U.S. PATENT DOCUMENTS

| | | | |
|---|---|---|---|
| 1,080,448 | 12/1913 | Honey | 33/393 |
| 1,230,074 | 6/1917 | Perkins | 33/393 |
| 1,571,687 | 2/1926 | O'Loughlin | 33/394 |
| 1,943,017 | 1/1934 | Harris | 33/393 |
| 2,343,688 | 3/1944 | Maxey | 33/392 |
| 2,729,897 | 1/1956 | Smith | 33/393 |
| 2,794,263 | 6/1957 | Cranmer | 33/392 |
| 3,068,573 | 12/1962 | Sidwell | 33/392 |
| 4,319,402 | 3/1982 | Martin | 33/392 |
| 4,442,610 | 4/1984 | Owens, Jr. | 33/392 |
| 4,459,761 | 7/1984 | Bosco | 33/393 |

FOREIGN PATENT DOCUMENTS 2507769 12/1982 France ........................... 33/392

Primary Examiner—Thomas B. Will.
Attorney, Agent, or Firm—Michael I. Kroll

[57] ABSTRACT

The present invention relates to a plumb-bob and magnet combination for attachment to a beam. The plumb-bob and magnet combination for attachment to a beam includes a magnet having a top flat surface that is connected to the base, the magnet having two opposing sides that contain recesses, a hollow casing for encompassing a string of the plumb-bob and having a top surface slidable along the magnet, the hollow casing including lips on the top surface for sliding engagement with the recesses on the sides of the magnet, a lock on one of the lips of the casing and being cam operated by a lever that moves in the direction of an arc on the top surface of the casing for locking and unlocking the casing to the magnet, and a cantilever extending from the casing and having a free end with an aex from which the string hangs with a weight at the free end, the string being wound in the casing.

1 Claim, 2 Drawing Sheets

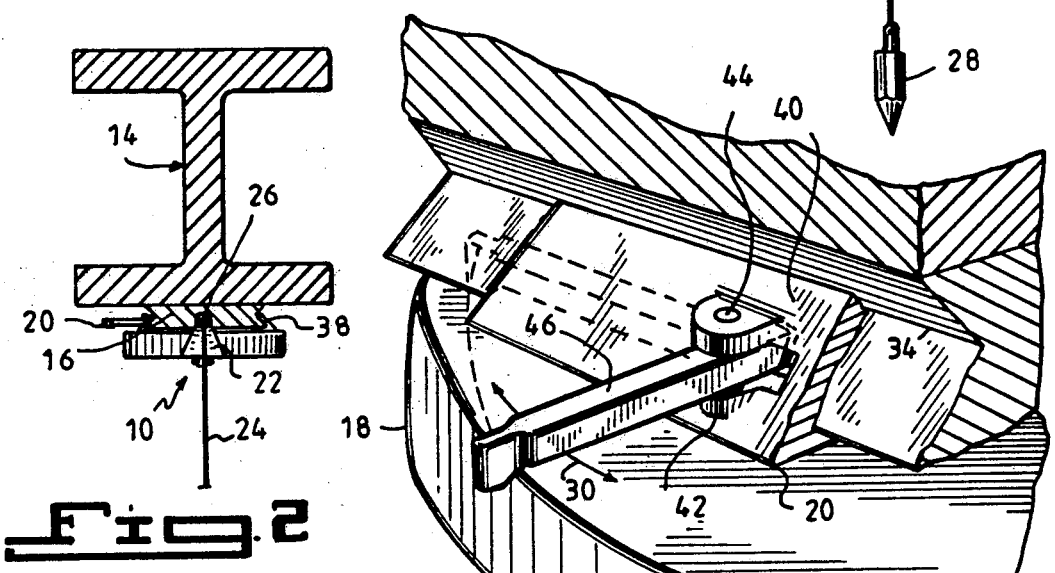

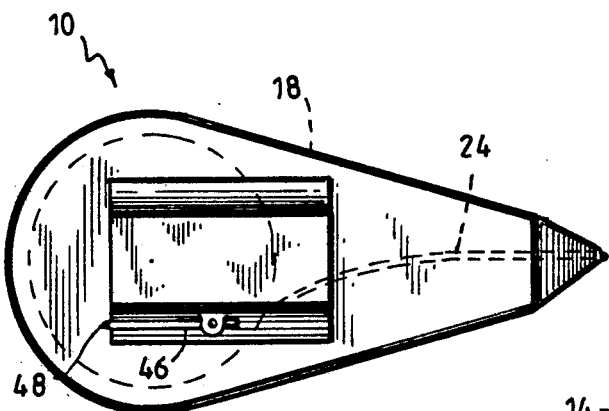
Fig. 6
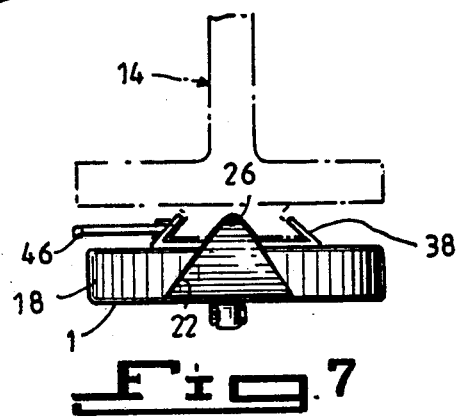
Fig. 7
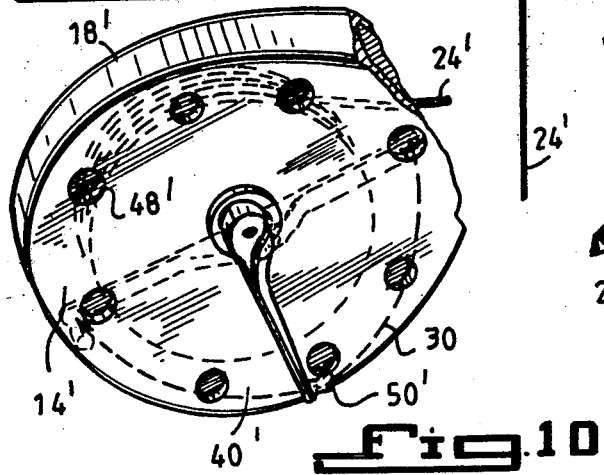
Fig. 8
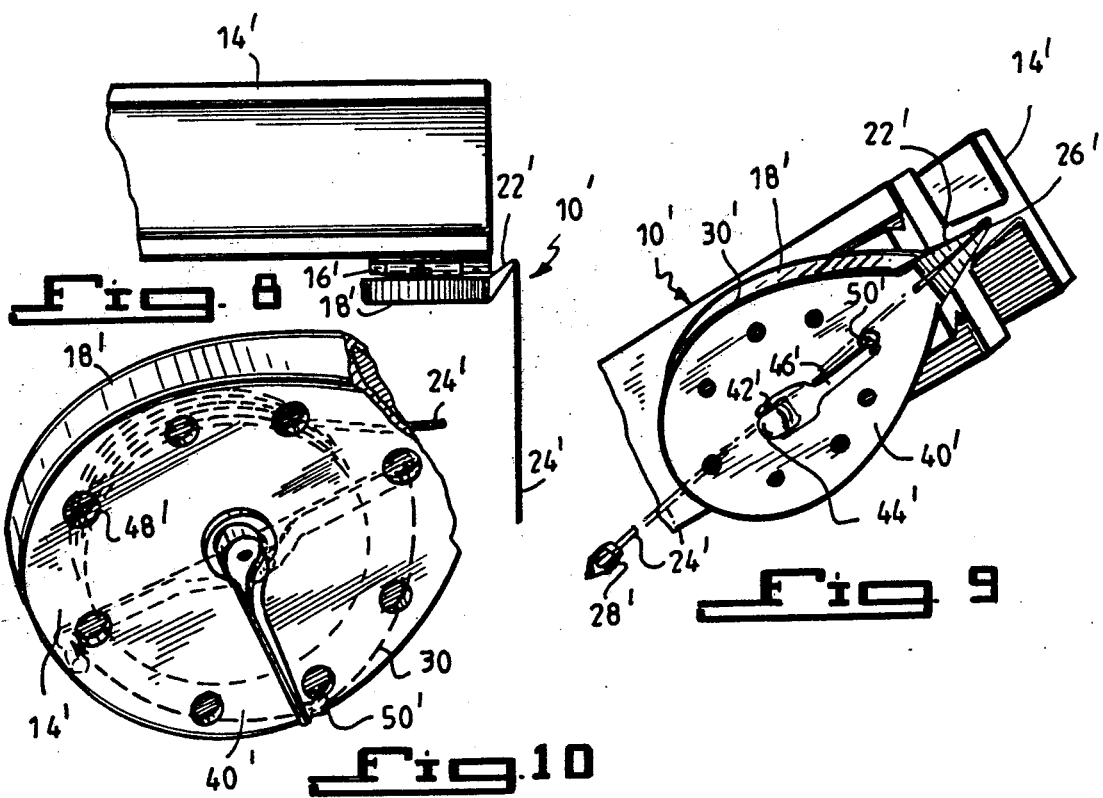
Fig. 9
Fig. 10

PLUMB-BOB

BACKGROUND OF THE INVENTION

1. Field of the invention

The present invention relates to a plumb-bob. More particularly, the present invention relates to an improved plumb-bob.

2. Description of the Prior Art

Numerous innovations for plumb-bobs have been provided in the prior art that are adapted to be used. Even though these innovations may be suitable for the specific individual purposes to which they address, they would not be suitable for the purposes of the present invention as heretofore described.

SUMMARY OF THE INVENTION

Accordingly, it is an object of the present invention to provide an improved plumb bob.

More particularly, it is an object of the present invention to provide an improved plumb-bob.

The improved plumb-bob is an automatic vertical definer. One of its advantages is that it is close to, if not touching the end of a beam. Further, the improved plumb-bob is attached to a beam by a permanent magnet and uses a lever to lock the plumb position once found.

Additionally, advantages of the improved plumb-bob can be found in the fact that it is easy to use and inexpensive. It has a high degree of versatility in that it can be used on all types of beams.

In keeping with these objects, and with others which will become apparent hereinafter, one feature of the present invention resides, briefly stated—in combination an improved plumb-bob attached to the end of a beam, including a permanent magnet for attaching the improved plumb-bob to the beam, a string, a casing to hold the string and disposed at the end of the beam, a cantilever emanating from the casing, a weight disposed at the end of the string, wherein locking means having a locked position and an unlocked position is provided.

When the improved plumb-bob is designed in accordance with the present invention, an accurate plumb can be achieved from the end of the beam.

In accordance with another feature of the present invention, the cantilever includes an apex.

Another feature of the present invention is that the string end is the free end.

Yet another feature of the present invention is that the locking means include a lever to change the locked position to the unlocked position and vice versa.

The novel features which are considered characteristic for the invention are set forth in particular in the appended claims. The invention itself, however, both as to its construction and its method of operation, together with additional objects and advantages thereof, will be best understood from the following description of the specific embodiments when read in connection with the accompanying drawing.

BRIEF DESCRIPTION OF THE DRAWING

FIG. 1 is a perspective view of the improved plumb-bob of the present invention attached to an "I" beam;

FIG. 2 is a side view of the present invention taken in the direction of arrow 2 in FIG. 1;

FIG. is a close up perspective view of the locking mechanism, shown in the closed position;

FIG. 4 is a plan view of the locking mechanism of the present invention, where it is shown unlocked in phantom;

FIG. 5 is a side view of the locking mechanism of the present invention;

FIG. 6 is a lower view of the improved plumb-bob of the present invention—shown is the locking mechanism in solid and the string in phantom;

FIG. 7 is a front view of the improved plumb-bob of the present invention in solid and the "I" beam in phantom;

FIG. 8 is a side view of the improved plumb-bob of the present invention shown close up;

FIG. 9 is a perspective view of the bottom of the improved plumb-bob of the present invention; and FIG. 10 is a perspective view showing the bottom of the locking mechanism.

DETAILED DESCRIPTION OF THE PREFERRED EMBODIMENT

In FIG. 1, the improved plumb-bob of the present invention 10 is shown attached to the bottom 12 of an "I" beam 14. A permanent magnet 16 provides the attachment.

The improved plumb-bob 10 of the present invention contains a casing 18, a locking mechanism 20, a cantilever 22, a string 24 hanging from the apex 26 of the cantilever 22. At the end of the string 24 is a weight 28.

FIG. 2 is shown containing the view presented by the arrow 2 of FIG. 1. This view shows the present invention in better detail. The "I" beam 14 is shown holding the improved plumb-bob 10 of the present invention by the permanent magnet 16, the locking mechanism 20 locking the cantilever 22 with the apex 26 locked in position. The string 24 is shown attached to the apex 26. The use of the apex 26 allows the string 24 to be closer to the "I" beam 14.

The FIG. 3 shows the details of the locking mechanism 20. The locking mechanism 20 can move in the directions of arrow 30, respectively, on the casing 18.

The magnet 16 interfaces between the "I" beam 14 and the improved plumb-bob 10 of the present invention. The magnet 20 has a recess 34 all around its circumference. The top 36 of the improved plumb-bob 10 of the present invention is formed with a lip 38 all around its circumference 40. The lip 38 where the locking mechanism 20 is attached includes a pivot 42 and a pivot pin 44. This allows the lever arm 46 to pivot and traverse the improved plumb-bob 10 of the present invention.

The extremes of the lever 46 is shown in FIG. 4. The solid line indicates the locked position 48 while the phantom line indicates the unlocked position 50.

FIG. 5 shows the magnet 16 attached to the "I" beam 14. The recess 34 in the magnet and the lip 38 in the casing 18 hold the improved plumb-bob 10 of the present invention in place. The lever arm 46 is shown, and so is the pivot 42, and pivot pin 44.

In FIG. 6, the bottom of the improved plumb-bob 10 of the present invention shows the lever 46 in the locked position 48 with the string 24 nicely wound within the casing 18.

In FIG. 7, the "I" beam is shown in phantom with the magnet removed and the cantilever 22 in front view. One can also see the recess 34 in phantom, and lip 38.

FIGS. 8 through 10 show an alternate embodiment of the improved plumb-bob 10, of the present invention. In this embodiment, 10', a series of holes 48' are positioned circularly around the circumference 40. These holes 30, provide locking points where the peg 50' can enter when the correct plumb position has been achieved.

It will be understood that each of the elements described above, or two or more together, may also find a useful application in other types of constructions differing from the type described above.

While the invention has been illustrated and described as embodied in an improved plumb-bob, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Plumb-bob and magnet combination for attachment to a beam, comprising:
    a) a magnet having a top flat surface that is connected to the beam, said magnet having two opposing sides that contain recesses;
    b) a hollow casing for encompassing a string of the plumb-bob and having a top surface slideable along said magnet, said hollow casing including engagement means on said top surface for sliding engagement with the recesses on the sides of said magnet;
    c) a lock on said engagement means of said casing and being cam operated by a lever that moves in the direction of an arc on said top surface of said casing for locking and unlocking said casing to said magnet; and
    d) a cantilever extending from said casing and having a free end with an apex from which said string hangs with a weight at said free end, said string being wound in said casing.

* * * * *